(12) United States Patent
Heide et al.

(10) Patent No.: US 12,470,889 B2
(45) Date of Patent: Nov. 11, 2025

(54) FUTURE VISUAL FRAME PREDICTION FOR AUTONOMOUS VEHICLES USING LONG-RANGE ACOUSTIC BEAMFORMING AND SYNTHETIC APERTURE EXPANSION

(71) Applicant: Torc Robotics, Inc., Blacksburg, VA (US)

(72) Inventors: Felix Heide, Blackburg, VA (US); Jim Aldon D'Souza, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 173 days.

(21) Appl. No.: 18/391,527

(22) Filed: Dec. 20, 2023

(65) Prior Publication Data

US 2024/0416953 A1 Dec. 19, 2024

Related U.S. Application Data

(60) Provisional application No. 63/508,784, filed on Jun. 16, 2023.

(51) Int. Cl.
*H04S 7/00* (2006.01)
*B60W 60/00* (2020.01)
(Continued)

(52) U.S. Cl.
CPC .............. *H04S 7/40* (2013.01); *B60W 60/00* (2020.02); *B60W 60/001* (2020.02); *G01S 5/18* (2013.01); *H04R 1/406* (2013.01); *H04S 7/302* (2013.01); *B60W 2420/40* (2013.01); *B60W 2420/403* (2013.01); *B60W 2420/54* (2013.01);
(Continued)

(58) Field of Classification Search
CPC .......... H04S 7/40; H04S 7/302; B60W 60/00; B60W 60/001; B60W 2556/40; B60W 2556/35; B60W 2420/40; B60W 2420/403; B60W 2420/54; G01S 5/18; H04R 1/406;
(Continued)

(56) References Cited

U.S. PATENT DOCUMENTS 6,005,610 A 12/1999 Pingali
6,914,854 B1 7/2005 Heberley et al.
(Continued)

OTHER PUBLICATIONS

International Search Report and Written Opinion dated Sep. 3, 2024 for International Patent Application No. PCT/US24/32569.

*Primary Examiner* — Sean H Nguyen
(74) *Attorney, Agent, or Firm* — Armstrong Teasdale LLP

(57) ABSTRACT

An autonomous vehicle including a microphone array of a plurality of microphones, a visual sensor network configured to receive visual signals, at least one processor, and at least one memory storing instructions is disclosed. The instructions, when executed by the at least one processor, cause the at least one processor to: (i) generate spatial beamforming maps locating a sound source using a beamforming model corresponding to acoustic signals received at the plurality of microphones of the microphone array; (ii) apply a synthetic aperture expansion to the acoustic signals to increase resolution of the spatial beamforming maps; and (iii) generate a future visual frame based at least partially upon temporal information extracted from the spatial beamforming maps and visualization maps generated based on the visual signals received by the visual sensor network.

20 Claims, 9 Drawing Sheets

(51) Int. Cl.
*G01S 5/18* (2006.01)
*H04R 1/40* (2006.01)
*H04R 3/00* (2006.01)

(52) U.S. Cl.
CPC ..... *B60W 2556/35* (2020.02); *B60W 2556/40* (2020.02); *H04R 3/005* (2013.01); *H04R 2201/401* (2013.01); *H04R 2499/13* (2013.01)

(58) Field of Classification Search
CPC .............. H04R 3/005; H04R 2201/401; H04R 2499/13
USPC .......................................................... 381/86
See application file for complete search history.

(56) References Cited

U.S. PATENT DOCUMENTS

| | | |
|---|---|---|
| 7,030,905 B2 | 4/2006 | Carlbom et al. |
| 8,098,842 B2 | 1/2012 | Florencio et al. |
| 9,444,558 B1 | 9/2016 | Carbone et al. |
| 9,598,076 B1 | 3/2017 | Jain et al. |
| 10,045,120 B2 | 8/2018 | Adsumilli et al. |
| 11,368,652 B1 | 6/2022 | Johnson et al. |
| 11,417,041 B2 | 8/2022 | Li et al. |
| 11,553,159 B1 | 1/2023 | Rothschild et al. |
| 11,620,903 B2 | 4/2023 | Xu et al. |
| 2007/0025183 A1 | 2/2007 | Zimmerman et al. |
| 2018/0284246 A1 | 10/2018 | LaChapelle |
| 2019/0302232 A1 | 10/2019 | Harrison |
| 2020/0234579 A1* | 7/2020 | Silver .................... G08G 1/166 |
| 2022/0208205 A1* | 6/2022 | Macoskey ............ H04R 29/005 |
| 2022/0219736 A1 | 7/2022 | Xu et al. |

\* cited by examiner

| Lower Band Limit (Hz) | Center Frequency (Hz) | Upper Band Limit (Hz) |
|---|---|---|
| 282 | 315 | 355 |
| 355 | 400 | 447 |
| 447 | 500 | 562 |
| 562 | 630 | 708 |
| 708 | 800 | 891 |
| 891 | 1000 | 1122 |
| 1122 | 1250 | 1413 |
| 1413 | 1600 | 1778 |
| 1778 | 2000 | 2239 |
| 2239 | 2500 | 2818 |
| 2840 | 4000 | 5680 |

FIG. 6

FUTURE VISUAL FRAME PREDICTION FOR AUTONOMOUS VEHICLES USING LONG-RANGE ACOUSTIC BEAMFORMING AND SYNTHETIC APERTURE EXPANSION

CROSS-REFERENCE TO RELATED APPLICATION

This application claims priority to and the benefit of U.S. Provisional Patent Application Ser. No. 63/508,784, entitled "OBJECT DETECTION FOR AUTONOMOUS VEHICLES USING LONG-RANGE ACOUSTIC BEAMFORMING," filed Jun. 16, 2023, and the content of which is incorporated herein in its entirety for all purposes.

TECHNICAL FIELD

The field of the disclosure relates generally to an autonomous vehicle and, more specifically, to systems and methods for future visual frame prediction using long-range acoustic beamforming and synthetic aperture expansion.

BACKGROUND OF THE INVENTION

Autonomous vehicles employ three fundamental technologies: perception, localization, and behaviors planning and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Behaviors planning and control technologies determine how to move through the sensed environment to reach a planned destination. Behaviors planning and control technologies process data representing the sensed environment and localization or mapping data to plan maneuvers and routes to reach the planned destination.

One element of perception for autonomous vehicles is object detection and understanding. At least some known object detection techniques utilize electromagnetic radiation based sensing modalities such as camera, radar, or LiDAR. However, performance of such technologies can be reduced for objects having low reflectance or in conditions where light-based sensor performance is degraded, e.g., adverse weather such as fog. And all such technologies are bound by physical limitations of electromagnetic waves.

Accordingly, there is a need of enhanced object detection and object tracking, and future visual frame prediction in challenging weather conditions for appropriate planning and behavior control.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, an autonomous vehicle including a microphone array of a plurality of microphones, a visual sensor network configured to receive visual signals, at least one processor, and at least one memory storing instructions is disclosed. The instructions, when executed by the at least one processor, cause the at least one processor to: (i) generate spatial beamforming maps locating a sound source using a beamforming model corresponding to acoustic signals received at the plurality of microphones of the microphone array; (ii) apply a synthetic aperture expansion to the acoustic signals to increase resolution of the spatial beamforming maps; and (iii) generate a future visual frame based at least partially upon temporal information extracted from the spatial beamforming maps and visualization maps generated based on the visual signals received by the visual sensor network.

In another aspect, a computer-implemented method including: (i) generating spatial beamforming maps locating a sound source using a beamforming model corresponding to acoustic signals received at a plurality of microphones of a microphone array; (ii) applying a synthetic aperture expansion to the acoustic signals to increase resolution of the spatial beamforming maps; and (iii) generating a future visual frame based at least partially upon temporal information extracted from the spatial beamforming maps and visualization maps generated based on visual signals received by a visual sensor network.

In yet another aspect, a non-transitory computer-readable medium (CRM) embodying programmed instructions is disclosed. The instructions, when executed by at least one processor of an autonomous vehicle, cause the at least one processor to perform operations including: (i) generating spatial beamforming maps locating a sound source using a beamforming model corresponding to acoustic signals received at a plurality of microphones of a microphone array; (ii) applying a synthetic aperture expansion to the acoustic signals to increase resolution of the spatial beamforming maps; and (iii) generating a future visual frame based at least partially upon temporal information extracted from the spatial beamforming maps and visualization maps generated based on visual signals received by a visual sensor network.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 6 is a table showing a range of frequency bands of the raw audio signals captured at a microphone array.

Figure 1:
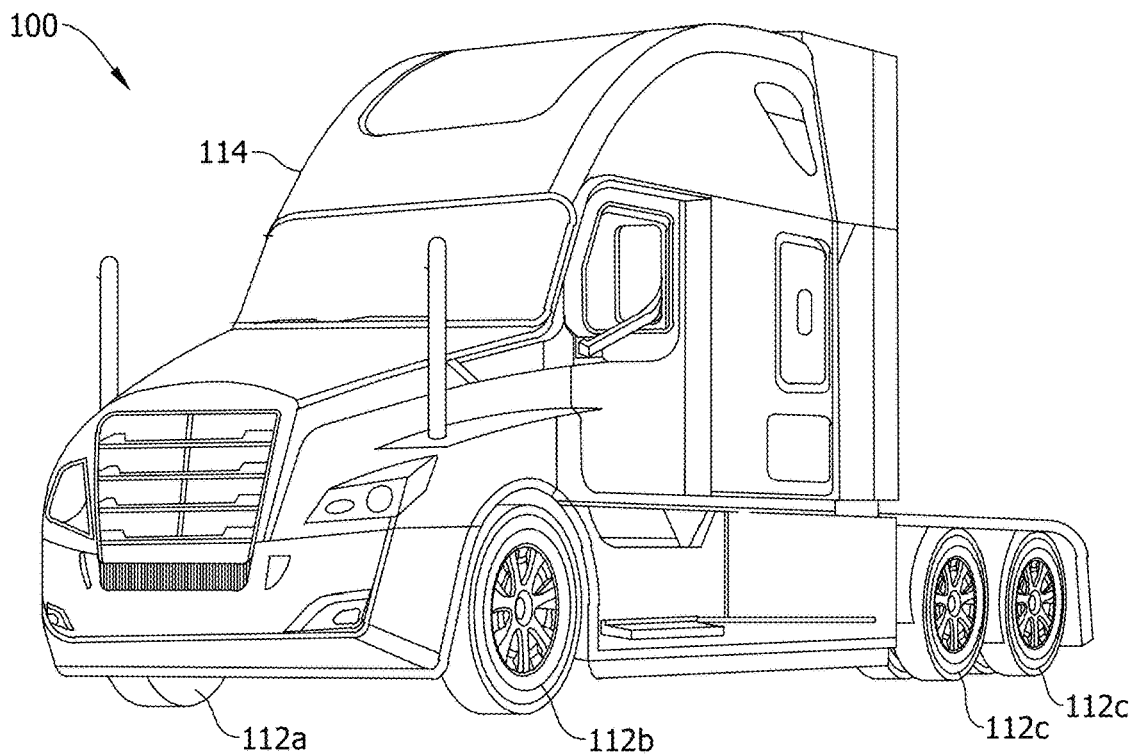
FIG. 1 is a schematic diagram of a truck having amenities in a cabin of the truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The Following terms are used in the present disclosure as defined below.

An autonomous vehicle: An autonomous vehicle is a vehicle that is able to operate itself to perform various operations such as controlling or regulating acceleration, braking, steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform a number of driving related operations such as keeping the vehicle in lane or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Autonomous vehicles rely heavily on sensors that use electromagnetic radiation like lidars, radars and cameras for perception. While use of electromagnetic radiation based sensors is effective in most scenarios, this electromagnetic (EM) radiation-based sensors may be unreliable in unfavorable environmental conditions, including low-light scenarios and adverse weather, in which the electromagnetic radiation based sensors can detect obstacles within their direct line-of-sight (LOS) while missing obstacles that are not within their direct LOS. However, audible sound from other road users propagates as acoustic waves carrying information even in challenging scenarios. However, due to low spatial resolution and lack of directional information in the acoustic waves, acoustic waves are not a preferable solution for sensing modality. In the present disclosure, various embodiments are described that employ a long-range acoustic beamforming of sound produced by road users in-the-wild as a complementary sensing modality as a solution to drawbacks of the EM radiation-based sensors in unfavorable environmental conditions. Embodiments described herein may employ a neural aperture expansion method for beamforming for multimodal object detection (or multimodal automotive object detection) in unfavorable environmental conditions. Additionally, in some embodiments, the multimodal object detection may further employ RGB images including red, green, and blue colors in different proportions in unfavorable environmental conditions.

As described herein, autonomous vehicles predominantly rely on several electromagnetic (EM) radiation-based sensing modalities such as camera, radar and lidar for diverse scene understanding tasks, including object detection, semantic segmentation, lane detection, and intent prediction. In some examples, fused data input from camera, lidar, or radar sensor configuration may be fused and robust data-driven perception algorithms using convolutional neural networks (CNNs), or vision transformers may be used for sensing modalities. However, currently known camera/radar/lidar stacks do not return signal for objects with low reflectance and in conditions where light-based sensors struggle, such as severe scattering due to fog. Also, known EM radiation-based active or passive sensor systems are fundamentally limited by the propagation of EM waves. However, acoustic waves are not subject to limitations observed by the propagation of EM waves. Most automotive vehicles generate noise due to engine/transmission, aerodynamics, braking, and contact with the road. Even electric vehicles are required by law to emit sound to alert pedestrians. Accordingly, acoustic sensing may be used as complimentary to currently known EM wave-based sensors to achieve improved performance despite challenges in spatially resolving the acoustic spectrum at meter wavelengths (e.g., a 1 kHz soundwave has a wavelength of about 35 cm in air).

In some embodiments, sensing modalities using acoustic sensing may require a multimodal long-range beamforming dataset (or multimodal acoustic beamforming dataset). The multimodal acoustic beamforming dataset may be generated using a vehicle equipped with a microphone array and a plethora of vision sensors and labeled by human annotators. By way of a non-limiting example, the microphone array may include microphones arranged in a grid, such as a grid of 32×32. Additionally, or alternatively, the microphone array may be a small aperture microphone array that employ a neural acoustic beamforming method. The multimodal acoustic beamforming dataset may include sound measurements from a planar microphone array, lidar, RGB images, GPS and IMU data. As described herein, the aperture-expanded beamforming maps recover spatial resolution typically lost in sound measurements and facilitate fusion with visual inference tasks. Further, visual and acoustic signals can complement each other in challenging automotive scenarios and can enable future frame predictions at kHz frequencies, which may be useful for object detection in non-line-of-sight and partially occluded scenes where purely vision-based sensing may fail.

As the proposed acoustic sensing modality relies on passive sound from traffic participants, beamforming measurements are limited to sound-producing vehicles. Beamforming of quieter traffic participants such as pedestrians and bicycles may be improved by infusing existing vision stacks with acoustic signals as it can be improved in challenging scenarios such as night scenes and under severe occlusion. In the following, how acoustic localization works, and related applications are described.

Acoustic localization is an often observed phenomenon in nature. Active techniques like echolocation, where sound signals are transmitted, and the corresponding reflected signals are analyzed for localization, navigation and prey detection is commonly observed in animals such as bats and dolphins. Systems such as sonar (sound navigation and ranging), which are common for underwater and robotics applications, also operate on the active echolocation principle. Passive techniques, on the other hand, involve analyzing ambient sound signals using an array of microphones via acoustic beamforming. Beamforming techniques locate sound sources based on the timing differences in the sound received by various microphones of a microphone array.

Apart from sound source localization, a microphone array of several microphones may be used for speech recognition accuracy from multi-channel inputs and tasks such as sound source separation. In some embodiments, sound sources may be located from visual inputs by associating image pixels to an object making a particular sound using audio-visual correlations and localization via trained neural networks. Alternatively, high-resolution feature maps may be learned via beamforming fused with visual inference models.

In some embodiments, stationary or hand-held microphone arrays for beamforming may be used. Alternatively, or additionally, the microphone array may be mounted on a moving vehicle. When a stationary microphone array is used for beamforming on passing vehicles, the multimodal long-range beamforming dataset may include a single sequence with 151 beamforming maps of a motorcycle passing by. Similarly, near-field acoustic holography may be used to generate beamforming maps for engine noise analysis of a stationary car. Such applications have recently been also used in commercial products for fault detection applications. An example multimodal long-range beamforming dataset described herein is an annotated dataset that includes about 3.2 million RGB frames with 5 cameras, 480 k lidar point clouds with IMU/GNSS annotations, raw microphone file and 42250 processed beamforming maps for each of the 11 frequency bands used in the dynamic automotive scenarios (or using a microphone array on a moving vehicle).

As described herein, several critical tasks such as object detection, lane detection, traffic light detection, depth estimation and end-to-end driving models for autonomous driving applications rely on multimodal sensor stacks, including camera, radar, lidar and gated near-infrared imaging sensors. These multi-sensor feeds are generally fused to jointly understand the cues in measurements to allow for redundancy in the presence of distortions, thereby enabling vision tasks. Many proposed multi-sensor methods such as an aggregate view object detection (AVOD) and a multi-view 3D network (MV3D) incorporate multiple sensor streams that are processed separately in the feature extraction stage, which may be complemented using acoustic beamforming as an extended sensing modality. By way of a non-limiting example, the acoustic beamforming, as described herein, may extract high-resolution spatial information from ambient roadside noise.

In some embodiments, environmental sound from ambient sources and active road participants may be measured using a planar microphone array, along with other sensor modalities, as shown in FIG. 1. In the present disclosure, the environmental sound may be interchangeably used as acoustic signals.

Acoustic wave propagation (or sound propagation) may be governed by the time-domain acoustic wave equation shown below.

$$\nabla^2 p(\vec{x}, t) - \frac{1}{c_s^2} \frac{\partial^2}{\partial t^2} p(\vec{x}, t) = f(\vec{x}, t) \quad \text{Eq. 1}$$

In the above equation, $\nabla^2$ is the Laplacian, p is a pressure at location ($\vec{x}$) at time (t), $C_s$ is the speed of sound in homogeneous media (typically 343 ms$^{-1}$), and $f(\vec{x}, t)$ is the forcing function corresponding to the source. The forcing function represents the sources of disturbances in the air pressure, e.g., the sound sources, as measured by the microphone sensor at a given space and time. For a monopole source q located at $\vec{x}_s$, the forcing function $f(\vec{x}, t)$ may be represented as $f(\vec{x}, t) = q(\vec{x}_s, t) \delta(\vec{x} - \vec{x}_s)$, where the Dirac delta function represents the geometric location of the acoustic source. The pressure resulting from this acoustic source at any given location $\vec{x}_s$ may be computed using the free space Green's function as below:

$$p(\vec{x}, t) = \frac{q(\vec{x}_s, t - |\vec{x} - \vec{x}_s|/c_s)}{4\Pi |\vec{x} - \vec{x}_s|} \quad \text{Eq. 2}$$

As shown in the free space Green's function, the acoustic pressure decays here inversely with the distance from the source. Also, since the acoustic pressure signal propagates at a constant speed $c_s$ in a given medium, the measured pressure at any instant at a given location is from the acoustic pressure produced by the sound source at a previous instant $\Delta t = |\vec{x} - \vec{x}_s|/c_s$.

For a planar microphone array including M spatially located microphones at $\vec{x}_m$ different positions, a pressure signal p($\vec{x}_m$, t) originated from a source q($\vec{x}_s$, t–$\Delta$t), each sensor of the acoustic camera's microphone array (or each microphone or acoustic sensor of the microphone array) may spatially sample the incoming wave as $\vec{y}_m = p(\vec{x}_m, t)$, and measurements thus collected may be used to construct a spatial map locating the sound source q via beamforming.

In some embodiments, for a single sound emitter at $\vec{x}_s$, the beamforming spatial map BF may be constructed following Eq. 2 above as:

$$BF(t, \vec{x}_s) = \frac{1}{M} \sum_{m=0}^{M} y_m(t - \Delta t_m) = \frac{4\Pi}{M} \sum_{m=0}^{M} p_m(\vec{x}_s, t + \Delta t_m) |\vec{x}_m - \vec{x}_s| \quad \text{Eq. 3}$$

In Eq. 3 above, $y_m$ represents measurements from the microphone array and $\Delta t_m$ corresponds with unknown time delays induced by travel times from the sound source to the microphone array. The final beamforming map of multiple sound sources is obtained by scanning through a range of time delays and superposing those acoustic signals corresponding to constructive interference of each individual sound source on the focal plane of the microphone array.

In some embodiments, measurement of environment sounds at the microphone array are performed using physical continuous acoustic pressure signal p(t) may be sampled at discrete time intervals p(n$\Delta$t) and may be interpreted digitally for beamforming. However, because the measured signals are prone to uncorrelated measurement noise at the acoustic sensors of the microphone array, the measured cross-spectral power between any two microphone pairs, in the presence of measurement errors, may be represented by:

$$C_{mn} = E[(\tilde{p}_m(\omega) + \zeta_m(\omega))(\tilde{p}_m(\omega) + \zeta_m(\omega))^*] \quad \text{Eq. 4}$$

In Eq. 4 above, $\tilde{p}(\omega)$ represents the frequency domain pressure obtained by Fourier-transforming the time domain measurement and $\zeta(\omega)$ represents the measurement error. By way of an example, it may be assumed that these measurement errors have a zero mean and finite variance a, and these measurements are statistically independent from the ambient acoustic signals, and, therefore, the cross-correlation between the errors as measured by any two microphones must be zero. Accordingly, the cross-power spectrum may be computed as $$C_{mn} = E[(\tilde{p}_m(f))(\tilde{p}_m(f))^*] + \sigma^2 I \quad \text{Eq. 5}$$

In Eq. 5 above, $\sigma^2 I$ represents the statistical variance of the measurement errors. The measurement errors only affect the diagonal elements of the cross-power spectrum matrix. Accordingly, the auto-power may be removed from the beamforming power signal output by eliminating the diagonal of the cross-power spectrum matrix to reduce the effects of measurement errors and further thresholding against a noise floor that suppresses ambient noise. By way of a non-limiting example, the employed microphones have a high dynamic range of −26 dBFS+/−1.5 dB (94 dB SPL at 1 kHz), which covers roadside sound from quiet electrical vehicles to large passenger trucks.

In some embodiments, neural acoustic beamforming method may be performed in which the diffraction limit of an acoustic camera may be given by 0.5λ/NA, where λ is the wavelength of the acoustic signal and NA is the numerical aperture of the microphone array system. Accordingly, a larger value of NA may be required for high-resolution beamforming for fusion with visual information camera or lidar sensors.

As discussed herein, using the beamforming, traffic environment where the sound is produced by, for example, the vehicle tires may be clearly visualized. A small aperture acoustic camera results in larger point spread functions (PSFs), thereby corrupting the beamformed reconstruction. However, a large microphone array is challenging to integrate in automotive vehicles, and, accordingly, a virtual large aperture microphone array may be synthesized for increasing the resolution of beamforming spatial maps. The beamforming spatial maps of acoustic signals with the increased resolution may benefit when combined with other sensor modalities.

In some embodiments, and by way of a non-limiting example, the beamforming spatial maps of acoustic signals may be reconstructed using a network architecture including a microphone array detecting acoustic signals and processing through a beam forming model and a synthetic aperture expander to generate multimodal signals for fusing with RGB signals for generating feature maps. The network architecture, thus, may have four stages: (i) a beamforming stage $f_{BF}$; (ii) a synthetic aperture expansion stage $f_{AE}$; (iii) a deconvolution state $f_{Deconv}$; and (iv) a task-specific application stage $f_{Task}$. The four stages of neural beamforming may be mathematically represented as:

$$O_{BF} = f_{Deconv}(f_{AE}(f_{BF}(p, F)), f_{BF}(\delta, F))) \quad \text{Eq. 6}$$

In Eq. 6 above, δ is a synthetic audio point source, p is the raw microphone measurement of the pressure signals, $F=[f_1, f_2, \ldots, f_n]$ are a set of acoustic frequencies used for beamforming.

In some embodiments, and by way of a non-limiting example, the synthetic aperture expander may be constructed as a fully convolutional neural network (CNN). The synthetic aperture expander network may learn to scale the beamforming maps corresponding to a smaller aperture into that of a larger aperture, and thereby effectively reducing the PSF of the acoustic sensor of the microphone array. The beamforming measurements processed through the synthetic aperture expander may be deconvolved with the PSF of a synthetic point source δ in order to mitigate the PSF blur on final measurements. Finally, the deconvolved features $O_{BF}$ may be used directly for downstream tasks such as object detection and future frame interpolation. Accordingly, the downstream task can be performed as:

$$O_{Task} = f_{Task}(O_{BF}) \quad \text{Eq. 7}$$

In Eq. 7 above, $f_{Task}$ is the function performing the downstream task and $O_{Task}$ is the corresponding task-specific output. Accordingly, beamforming features may be used for specific tasks or applications such as, object detection on unseen in-the-wild traffic scenarios ($f_{Task}=f_{detect}$) or future frame prediction ($f_{Task}=f_{future}$).

In some embodiments, for the beamforming map of a microphone array spanning d×d m² as $I_d=f_{BF}(P_d, F)$, the synthetic aperture expansion stage $f_{AE}$ may be trained by minimizing as shown below:

$$\mathcal{L}_{AE} = (L_2 + \mathcal{L}_s)(f_{AE}(I_d), I_{d'}) \quad \text{Eq. 8}$$

In Eq. 8 above, $L_2$ is the mean-squared error, $L_S$ is a spatial gradient loss, $I_d$ is a smaller aperture beamforming input, and $I_{d'}$ is a larger aperture beamforming target. In one example, the microphone array may be microphones or acoustic sensors arranged in a grid pattern of 32×32 and the CNN for synthetic aperture expansion may be trained on a subarray of 24×24.

In some embodiments, subsequent to the synthetic aperture expansion, specific vision tasks may be performed. By way of a non-limiting example, the multimodal optimization loss that relies on visual and acoustic inputs for object detection ($f_{Task}=f_{detect}$) may be as follows:

$$\mathcal{L}_{detect} = \mathcal{L}_{IoU}(f_{detect}(I_{RGB}, O_{BF}), B_{gt}) \quad \text{Eq. 9}$$

In Eq. 9 above, $\mathcal{L}_{IoU}$ is the intersection-over-union loss and $B_{gt}$ is the ground truth bounding box. For future frame prediction, $f_{future}$, a previous RGB frame $I_{RGB}^t$ at time t may be extrapolated using signals $O_{BF}^{t+kT}$ in which k is current BF sample modulo sampling rate, T is sampling time of BF sensor, and t+kT is the current time. Accordingly, the corresponding loss for this task may be expressed as:

$$\mathcal{L}_{future} = (\mathcal{L}_{perc} + \mathcal{L}_{adv})\big(O_{RGB}^{t+kT}, I_{RGB}^{t+kT}\big) \qquad \text{Eq. 10}$$

In Eq. 10 above, $O_{BF}^{t+kT} = f_{future}(O_{BF}^{t-n+1}, \ldots, t,t+kT, I_{RGB}^{t-n+1}, \ldots, t,t+kT)$ where n is integer time steps, $\mathcal{L}_{perc}$ and $\mathcal{L}_{adv}$ are perceptual and adversarial losses, respectively, and high framerate of acoustic measurements may be exploited by feeding n RGB and n+1 audio frames into the CNN to train the CNN to predict n+1$^{th}$ RGB frame.

In some embodiments, as described herein, the long-range acoustic beamforming dataset may include roadside noise along with ambient scene information. The ambient scene information may be captured using an RGB camera, lidar, radar, global positioning system (GPS), or an inertial measurement unit (IMU), etc., mounted on a vehicle. Additionally, a microphone array for beamforming may also be mounted on the vehicle.

By way of a non-limiting example, the microphone array may be a microphone array of 1024 microphones arranged in a grid pattern (e.g., a grid of 32×32). The microphone in the microphone array may be operating at 46875 Hz sampling rate, 1 Hz-20 kHz frequency range, covering 640 mm×640 mm measurement area. Each microphone may have 63 dB SNR (A-weighted, at 1 kHz), −26 dBFS sensitivity, and 116 dB acoustic overload point. The microphones arranged in the grid pattern may have a 20 mm grid spacing. For far field beamforming, the sensor's large surface area of 409600 mm2 may enable operations on larger wavelengths and therefore measurement of lower frequency sources, whereas the microphone grid spacing may dictate the upper frequency bounds. By way of a non-limiting example, such a microphone array may sense frequencies as low as 250 Hz and as high as 10 kHz emanating from ambient sources.

By way of a non-limiting example, an RGB camera operating at 25 Hz frame rate, 70.42° horizontal field of view (HFoV) and 43.3 vertical field of view (VFoV) and having 1280×720 resolution may be used for detection of visual ambience. Additionally, or alternatively, serial cameras with 30 Hz frame rate, 1920×1200 resolution, 60° HFoV, rolling shutter, and 1/2.7" complementary metal oxide semiconductor (CMOS) digital sensor may for detection of visual ambience. Visual ambience may be detected using 64 channel lidar operating at 20 Hz, 360° HFoV, 40° VFoV, covering a 200 m range and 0.4° angular resolution, or a GNSS having 20 Hz dual antenna navigation system for GPS/GLONASS/Galileo/BeiDou. One or more RGB cameras, one or more serial cameras, or one or more lidars may all be part of a visual sensor network that receives visual signals to detect the visual ambience.

In some embodiments, and by way of a non-limiting example, the microphone array may be mounted on a rail attached to a front bumper of the vehicle, while the RGB camera is coplanar with, and mounted, for example, 36 cm below the center of the microphone array on the same frame or rail to minimize the projection errors of beamformed maps on the image caused by vibrations. Four serial cameras may be mounted on the roof and face along with the lidar and dual antennas for the GNSS navigation system, and four serial cameras may be mounted on roof rails in a dual stereo camera configuration of two different baselines. A receiver unit of the dual antenna for the GNSS navigation system may house the IMU and GNSS modules that serve as the car coordinate frame's origin. The receiver unit may be mounted in the trunk above the rear-axle midpoint. The sensors may be calibrated and synchronized prior to use.

In some embodiments, and by way of a non-limiting example, the RGB camera may be enabled for capturing during sound measurements by the microphone array. Measurements by each sensor may be time-stamped and synchronized with GNSS as time reference. The microphone array signals may be recorded, for example, at 10 seconds interval at a sampling rate 46.875 kHz. Additionally, or alternatively, the vehicle speed may be maintained between predetermined speed range to minimize the effect of high winds on the acoustic readings.

In some embodiments, acquired visual and sound measurements data may be annotated. By way of a non-limiting example, annotations may be performed manually by a human operator in a plurality of sound classes (e.g., 11 sound classes) and a plurality of vision classes (e.g., 6 vision classes). In addition to image class labels, each sampled image may be annotated with sound labels in two domains: dominant (distinct and in foreground) and secondary (in the background). All labels may be created by human annotators using a custom toolset and may be processed through subsequent phases of verification and quality assurance to ensure high-quality labels. All object instances may be annotated using tightly fitted 2D bounding boxes aligned to image axis and encoded as top left and bottom right coordinates in the image frame.

As described herein, acoustic beamforming combined with RGB data may improve multimodal scene understanding tasks and future frame prediction in comparison with using currently known RGB-only or acoustic-only methods. Further, multimodal inputs to the network may include concatenated vision and audio beamforming signals. While using RGB and acoustic signals for multimodal automotive object detection, $f_{Task} = f_{detect}$, detection network algorithm such as, you only look once (YOLO) object detection algorithm, may be used. Additionally, the detector on concatenated image and beamforming maps may be fine-tuned to allow object detection with a higher accuracy in challenging scenes where low-light, motion blur, and glare confound the RGB detector.

Additionally, or alternatively, acoustic beamforming maps may provide context cues for predicting future RGB frames from RGB streams with low temporal resolution, $f_{Task} = f_{future}$. By way of a non-limiting example, an acoustic capture system of 46 kHz sampling rate may be used to extrapolate previous RGB frames at the same ultra-fast update rate using a temporal sliding window of beamforming, despite the RGB camera operating only at 30 Hz without accessing future beamforming maps. In some embodiments, a modified Pix2PixHD network may be trained to take temporal information of both RGB images and beamforming maps based on Eq. 10. The RGB images and beamforming maps include, or embedded with, temporal information (or timestamp information) based on the RGB cameras and the microphones in the microphone array that are synchronized with GNSS as time references prior to use. Additionally, audio cues may improve future frame prediction over RGB-only extrapolation. In order to predict several frames into the future, predictions based on previously predicted RGB frames and the corresponding measured audio inputs may be cascaded following Eq. (10).

In some embodiments, in non-line-of-sight and partial occlusion scenarios, acoustic sensors may complement photon-based sensors, as described herein, for the detection of an oncoming object that is not directly visible to an RGB or lidar sensor as being hidden behind an opaque wall. Thus, multi-modal acoustic sensing, as described herein, may allow for new redundancies, where acoustic sensors provide information that the other sensors cannot.

The disclosed systems and methods employ long-range acoustic beamforming of sound produced by road users "in-the-wild" as a sensing modality. Automotive vehicles generate myriad noises as a result of engine and transmission operation, aerodynamics, braking, road contact, or synthetic noise (e.g., horns, beeps, alarms, audio). Recognizing the prevalence of acoustic sources in an autonomous vehicle's environment, and the limitations of electromagnetic radiation based sensors systems, the disclosed systems and methods employ acoustic sensors (e.g., transducers, microphones) for object detection.

The disclosed systems and methods include a method of neural aperture expansion for beamforming for an autonomous vehicle. More specifically, the disclosed systems and methods include a multimodal object detection system employing long-range acoustic beamforming as a complementary modality with RGB imaging. The disclosed systems and methods employ an object detection algorithm trained with a long-range acoustic beamforming dataset including sound measurements from a planar microphone array, LiDAR, RGB images, GPS, and IMU data.

As the proposed acoustic sensing modality relies on passive sound from traffic participants, beamforming measurements are limited to sound-producing vehicles. Beamforming of quieter traffic participants such as pedestrians and bicycles is challenging, and existing vision stacks may be infused with acoustic signals for enabling robust scene understanding in challenging scenarios such as night scenes and under severe occlusion.

Accordingly, a method for learning from acoustic microphone arrays and interpret roadway traffic noise as a complementary sensing modality for automotive imaging and scene understanding may facilitate detection within challenging environmental conditions. Further, the complementary nature and multi-modal sensing, as described herein, may be used to develop arbitrary and optimizable camera and microphone array system geometries.

One embodiment of the disclosed systems includes an autonomous vehicle including a variety of sensors, including at least one acoustic sensor, for perceiving the environment around the autonomous vehicle. The autonomous vehicle includes a perception system, including one or more processors and the variety of sensors, for detecting objects and obstacles in the environment and, in some cases, for determining their relative locations, velocities, and to make judgments about their future states or actions. Environmental perception includes object detection and understanding and may be based at least in part on data collected by acoustic sensors, image data collected, for example, by LiDAR sensors, radar, sonar, ultrasonic, or visual or RGB cameras, among other suitable active or passive sensors.

One embodiment of the disclosed systems includes an autonomous vehicle including one or more processors or processing systems that execute localization, i.e., a localization system. Localization is the process of determining the precise location of the autonomous vehicle using data from the perception system and data from other systems, such as a global navigation satellite system (GNSS) (e.g., a global positioning system (GPS) or an inertial measurement unit (IMU). The autonomous vehicle's position, both absolute and relative to other objects in the environment, is used for global and local mission planning, as well as for other auxiliary functions, such as determining expected weather conditions or other environmental considerations based on externally generated data.

One embodiment of the disclosed systems includes an autonomous vehicle including one or more processors or processing systems that execute behaviors planning and control, i.e., a behavior planning and control system. Behaviors planning and control includes planning and implementing one or more behavioral-based trajectories to operate an autonomous vehicle similar to a human driver-based operation. The behaviors planning and control system uses inputs from the perception system or localization system to generate trajectories or other actions that may be selected to follow or enact as the autonomous vehicle travels. Trajectories may be generated based on known appropriate interaction with other static and dynamic objects in the environment, e.g., those indicated by law, custom, or safety. The behaviors planning and control system may also generate local objectives including, for example, lane changes, obeying traffic signs, etc.

Various embodiments described above are discussed in more detail below with respect to FIGS. 1-10.

FIG. 1 illustrates an autonomous vehicle 100 that may further be conventionally connected to a single or tandem trailer to transport the trailers (not shown) to a desired location. The autonomous vehicle 100 includes a cabin 114 and can be supported by, and steered in, the required direction by front wheels 112a, 112b, and rear wheels 112c that are partially shown in FIG. 1. Wheels 112a, 112b are positioned by a steering system that includes a steering wheel and a steering column (not shown in FIG. 1). The steering wheel and the steering column may be located in the interior of cabin 114.

Figure 2:
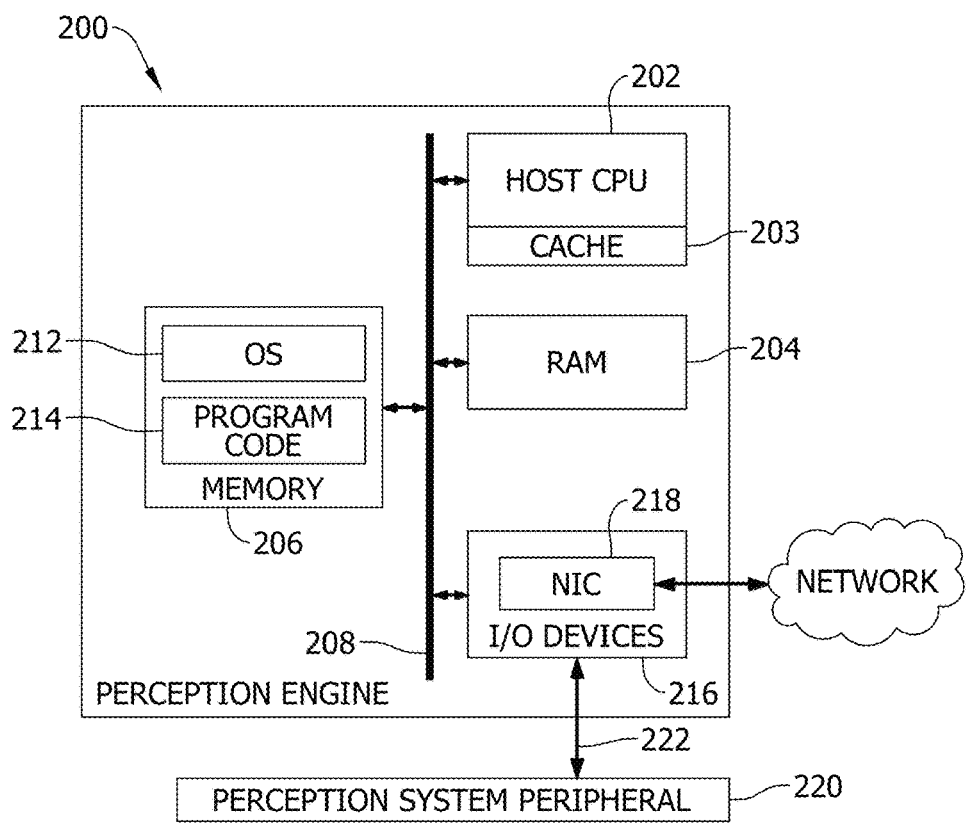
FIG. 2 is a block diagram of a perception system.

FIG. 2 is a block diagram of an example perception system 200 for sensing an environment in which an autonomous vehicle is positioned. Perception system 200 may be implemented in an autonomy computing system on an autonomous vehicle, such as autonomous vehicle 100 shown in FIG. 1, or in another embedded computing system such as an electronic control unit (ECU). Perception system 200 includes a CPU 202 coupled to a cache memory 203, and further coupled to RAM 204 and memory 206 via a memory bus 208. Cache memory 203 and RAM 204 are configured to operate in combination with CPU 202. Memory 206 is a computer-readable memory (e.g., volatile or non-volatile) that includes at least a memory section storing an OS 212 and a section storing program code 214. In alternative embodiments, one or more section of memory 206 may be omitted and the data stored remotely. For example, in certain embodiments, program code 214 may be stored remotely on a server or mass-storage device and made available over a network to CPU 202.

Perception system 200 also includes I/O devices 216, which may include, for example, a communication interface such as a network interface controller (NIC) 218, or a peripheral interface for communicating with a perception system peripheral device 220 over a peripheral link 222. I/O devices 216 may include, for example, a GPU for operating a display peripheral over a display link, a serial channel controller or other suitable interface for controlling a sensor peripheral such as one or more acoustic sensors, a LiDAR sensor or a camera, or a CAN bus controller for communicating over a CAN bus.

Figure 3:
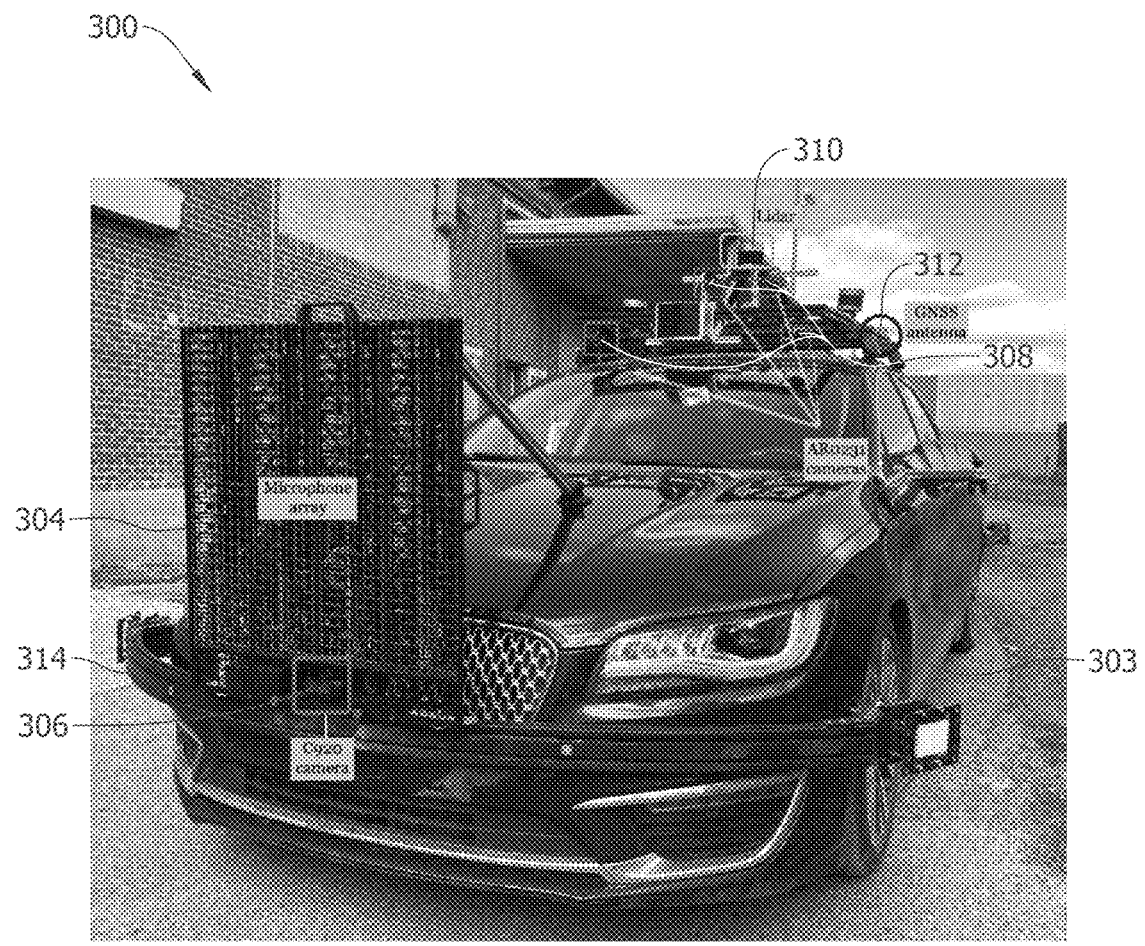
FIG. 3 is an example vehicle configuration to capture measurements for generating a multimodal acoustic beamforming dataset.

FIG. 3 is an example vehicle configuration 300 to capture measurements for generating a multimodal acoustic beamforming dataset. As shown in FIG. 3, a large dataset of acoustic pressure signals at several frequencies from roadside noise may be received using a test vehicle 302. As shown in FIG. 3, a microphone array 304 may include, for example, 1024 microphones arranged in a grid pattern (e.g., a grid of 32×32). The microphones in the microphone array 304 may be operating at 46875 Hz sampling rate, 1 Hz-20 kHz frequency range, covering 640 mm×640 mm measurement area. Each microphone in the microphone array 304 may have 63 dB SNR (A-weighted, at 1 kHz), −26 dBFS sensitivity, and 116 dB acoustic overload point. The microphones in the microphone array 304 arranged in the grid pattern may have a 20 mm grid spacing. As described herein, for far field beamforming, the sensor's large surface area of 409600 mm2 may enable operations on larger wavelengths and therefore measurement of lower frequency sources, whereas the microphone grid spacing may dictate the upper frequency bounds. By way of a non-limiting example, the microphone array 304 may sense frequencies as low as 250 Hz and as high as 10 kHz emanating from ambient sources.

As shown in FIG. 3, an RGB camera 306 mounted on the test vehicle 302 may operate at 25 Hz frame rate, 70.42° horizontal field of view (HFoV) and 43.3 vertical field of view (VFoV) and have 1280×720 resolution. The RGB camera 306 may be used for detection of visual ambience. Additionally, or alternatively, serial cameras 308 with 30 Hz frame rate, 1920×1200 resolution, 60° HFoV, rolling shutter, and 1/2.7" complementary metal oxide semiconductor (CMOS) digital sensor may be mounted on the test vehicle 303 for detection of visual ambience. Visual ambience may be detected using 64 channel lidar 310 operating at 20 Hz, 360° HFoV, 40° VFoV, covering a 200 m range and 0.4° angular resolution mounted on the test vehicle 302. A GNSS having dual antenna navigation system 312 for GPS/GLONASS/Galileo/BeiDou may also be used. By way of a non-limiting example, the GNSS having dual antenna navigation system 312 may operate at 20 Hz.

In some embodiments, and by way of a non-limiting example, the microphone array 304 may be mounted on a rail 314 attached to a front bumper of the test vehicle 302, while the RGB camera 306 is coplanar with, and mounted, for example, 36 cm below the center of the microphone array 304 on the same frame or rail 314 to minimize the projection errors of beamformed maps on the image caused by vibrations. Four serial cameras 308 may be mounted on the roof of the test vehicle 302 and face along with the lidar 310 and dual antennas for the GNSS navigation system 312, and four serial cameras 308 may be mounted on roof rails (not labeled in FIG. 3) in a dual stereo camera configuration of two different baselines. A receiver unit (not shown in FIG. 3) of the dual antenna for the GNSS navigation system 312 may house the IMU and GNSS modules (not shown in FIG. 3) that serve as the car coordinate frame's origin. The receiver unit may be mounted in the trunk of the test vehicle 302 above the rear-axle midpoint.

Figure 4:
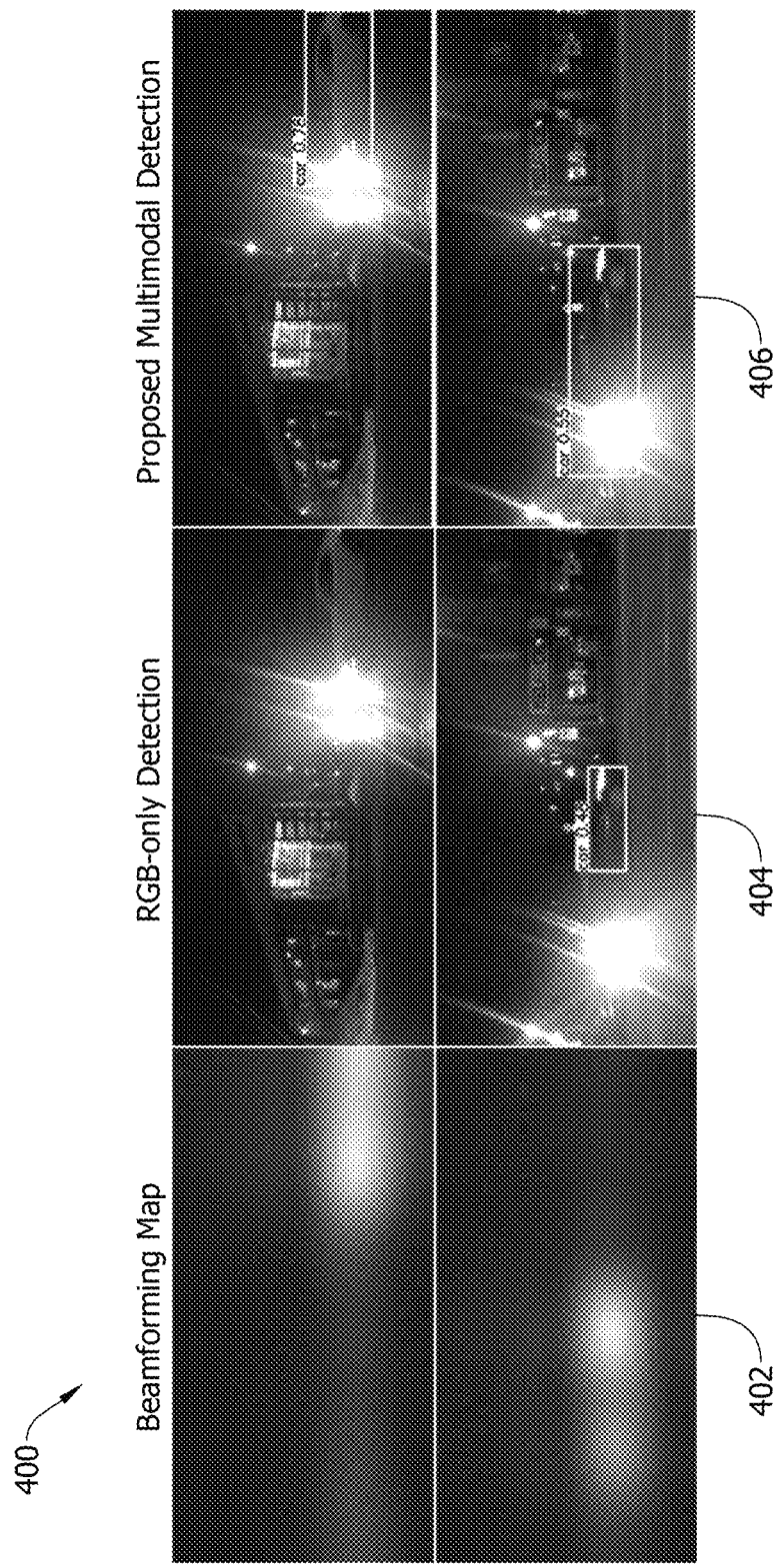
FIG. 4 is an example view of results obtained using acoustic beamformed signals (or using acoustic beamforming), RGB signals, and the multimodal sensing.

FIG. 4 is an example view 400 of results obtained using acoustic beamformed signals (or using acoustic beamforming) 402, RGB signals 404, and the multimodal sensing 406 as described herein. By way of a non-limiting example, beamformed signals 402 at the 4000 Hz octave band from the available 250-5000 Hz frequency bands in the dataset may be visualized. Using RGB signals 404 only may result in missed and inaccurate detections at night, and the complementary nature of acoustic beamformed signals 402, on the other hand, may help robustly detect the objects in challenging night scenarios as shown in FIG. 4 as multimodal sensing 406.

Figure 5:
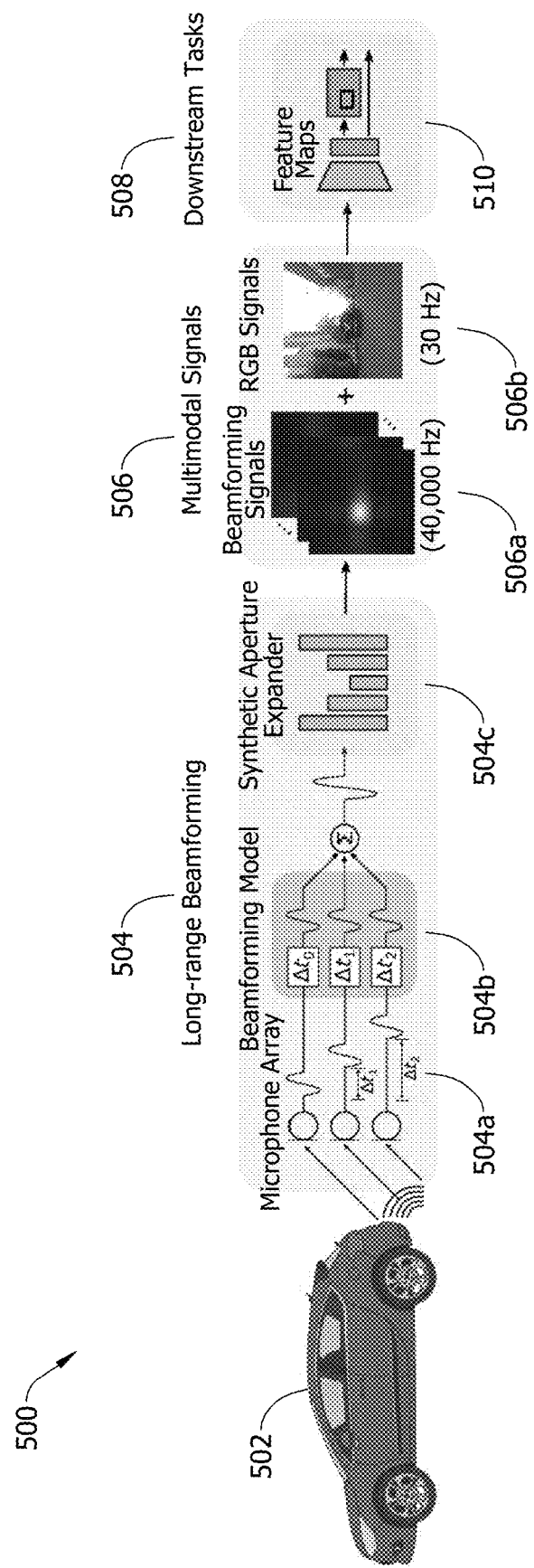
FIG. 5 illustrates an example network architecture of multimodal sensing.
Figure 8:
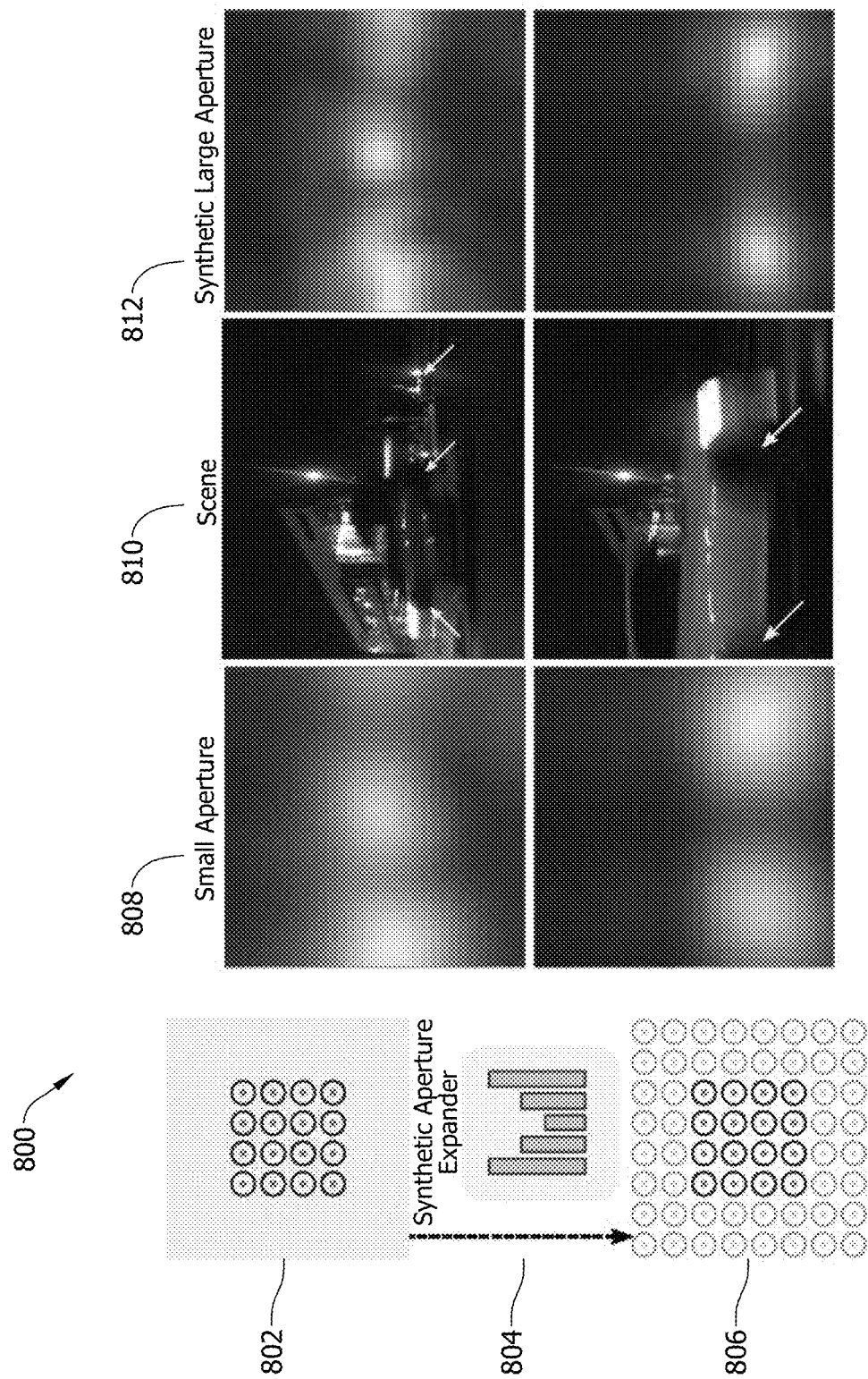
FIG. 8 illustrates a synthetic aperture expansion.

FIG. 5 illustrates an example network architecture or a pipeline 500 in which ambient noise generated, for example, by the vehicle 502 is received at a microphone array 504a as described above with respect to FIG. 3. The microphones in the microphone array may receive acoustic signals at different times based upon their positions in the microphone array 504a. For example, one microphone in the microphone array 504a may receive acoustic signal at time to, another microphone in the microphone array 504a may receive the same signal at $t_0+\Delta t_1$, and some other microphone in the microphone array 504a may receive the same signal at $t_0+\Delta t_2$. Each microphone of the microphone array 504a thus spatially samples the incoming pressure wave from the ambient noise, and the corresponding measurements may be used to generate a spatial map locating the sound source q via beamforming model 504b such as described herein using Eq. 2-Eq. 7 above. By way of a non-limiting example, the beamforming model 504b may be a neural network (e.g., convolution neural network) based beamforming model. An output from the beamforming model 504b may be provided as an input to a synthetic aperture expander 504c which is trained on a smaller or a subarray of the microphone array 504a to synthetically expand the aperture of the microphone array to produce higher fidelity beamforming maps visualizing sound from the ambient noise or vehicles with smaller PSF corruption, for example, as shown in FIG. 8 below. The beamforming maps 506a visualizing sound from the ambient noise or vehicles may then be combined with RGB signals 506b for multimodal signal sensing 506 for various downstream tasks 508 such as an object detection or a future frame prediction based on feature maps 510.

Accordingly, the pipeline 500 measures roadside noise using a microphone array sensor of the microphone array and a beamforming map of acoustic signals is computed as complementary modality to existing sensor stacks (e.g., lidar, radar, camera, etc.). A trained neural network translates multimodal signals to interpretable traffic scene information which can be used for downstream tasks such as object detection and predicting a future RGB camera frame.

FIG. 6 is a table showing a range of frequency bands of the raw audio signals captured at the microphone array 504a. As shown in the table of FIG. 6, acoustic signals of 282 Hz to 5680 Hz may be received and processed to generate feature maps for an object detection or a future RGB frame prediction.

Figure 7:
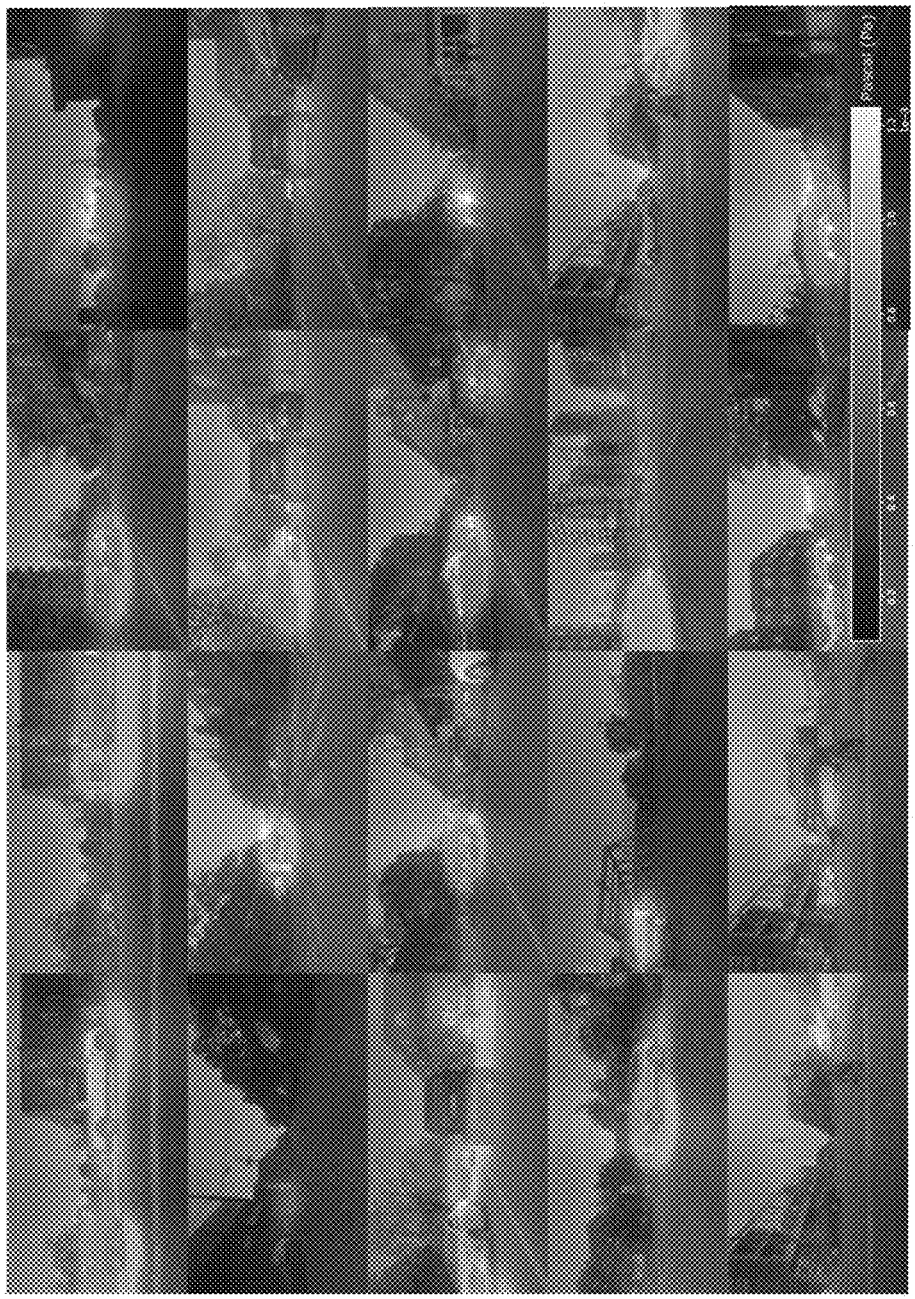
FIG. 7 illustrates a snapshot visualization of multimodal sensing.

FIG. 7 is an illustration of a snapshot visualization of multimodal sensing 700, for example, acoustic beamforming maps overlayed on RGB images. By way of a non-limiting example, the snapshot visualization of multimodal sensing 700 may be generated using the multimodal long-range beamforming dataset (or multimodal acoustic beamforming dataset) described herein.

FIG. 8 illustrates synthetic aperture expansion 800 for a microphone array 802, which may be a 32×32 microphone array, and a synthetic aperture example 804 may be trained using a CNN on a smaller subarray 806, which may be a 24×24 microphone array, to synthetically expand the aperture of the microphone array to produce higher fidelity beamform maps with smaller PSF corruption. The above beamforming maps visualize sound from the vehicles 810 indicated by see arrows. As shown in FIG. 8, a smaller aperture results in blurry beamforming outputs 808 compared to larger aperture beamforming outputs 812.

Figure 9:
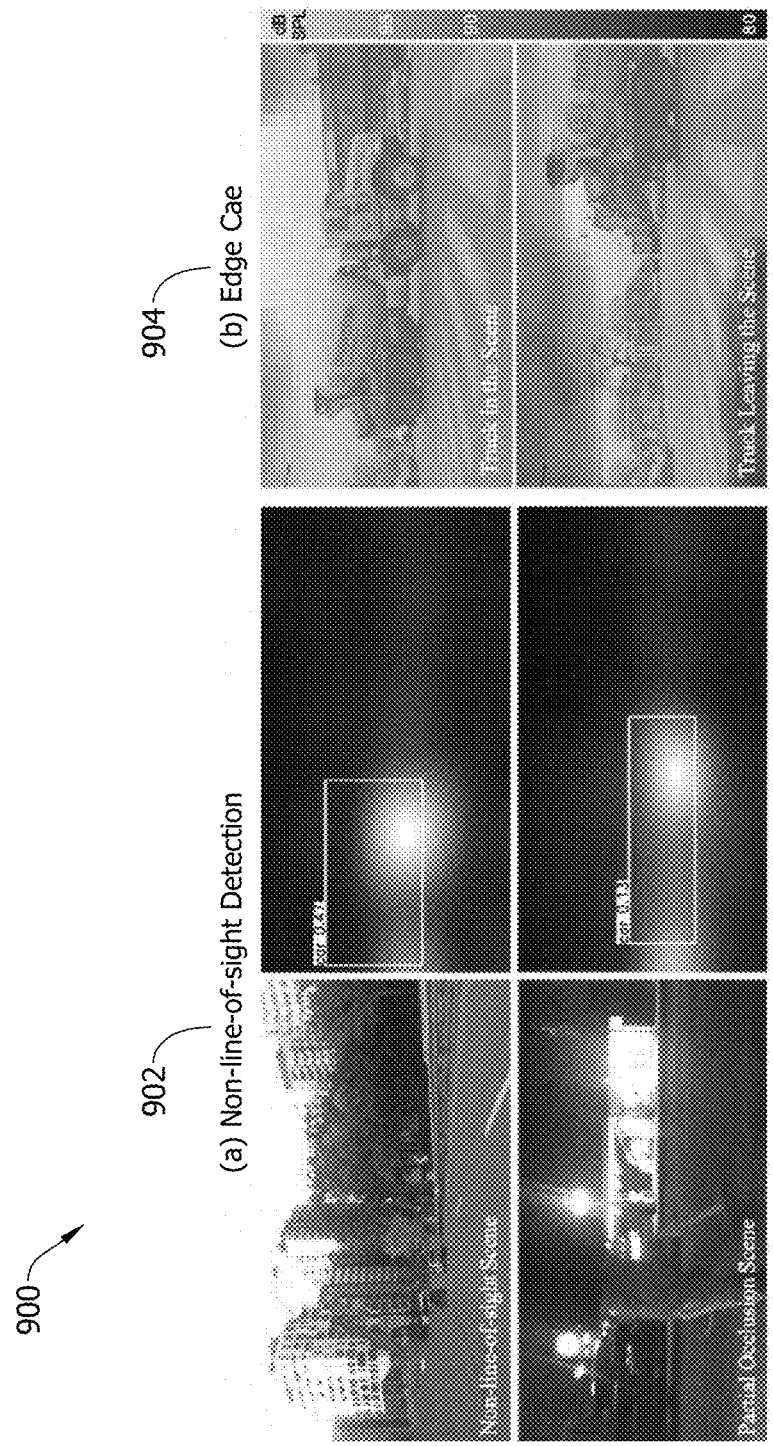
FIG. 9 illustrates a snapshot of scenarios in which object detection is generally not be possible with RGB signals alone.

FIG. 9 illustrates a snapshot 900 of scenarios in which object detection may not be possible with RGB signals alone. For example, as shown in FIG. 9 as 902, oncoming vehicles showing using arrows that fully or partly occluded in the RGB frame may be detected using acoustic sensor or multi modal sensing techniques as described herein. Similarly, multi modal sensing techniques may also help in generating clear visualization in edge cases, for example, where a loud vehicle exceeding the dynamic range may corrupt the beamforming maps.

Figure 10:
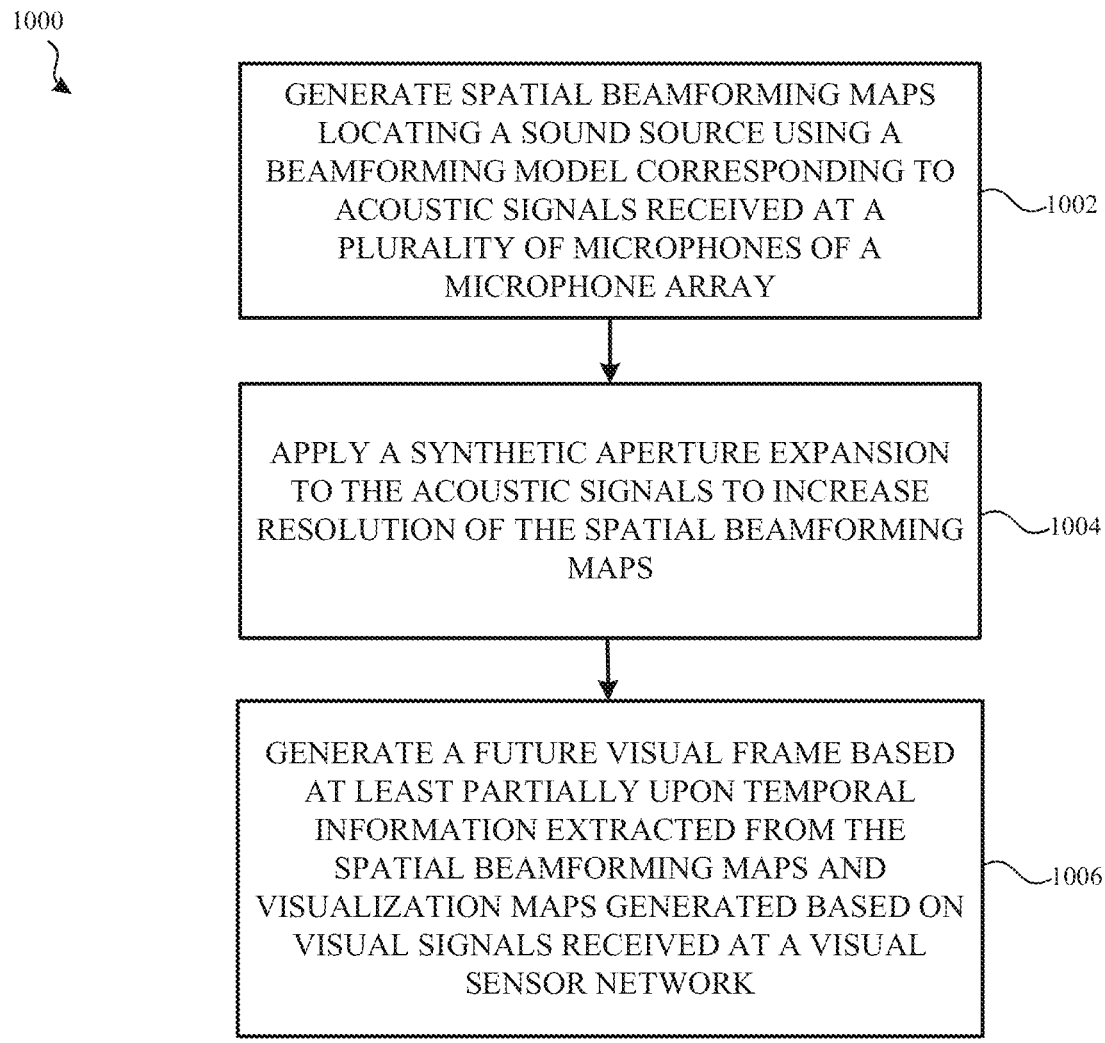
FIG. 10 is a flow-chart of an example method of predicting a future visual frame for an application in autonomous vehicle driving.

FIG. 10 is a flow-chart of an example method of predicting a future visual frame for an application in an autonomous vehicle driving. In particular, the application is a future visual frame prediction used by the planning and behavior control system in identifying what action needs to be performed. In other words, prediction of the future visual frame may provide sufficient or needed time to respond to a situation. The autonomous vehicle may include a microphone array of a plurality of microphones and a visual sensor network configured to receive visual signals. The autonomous vehicle may include at least one processor and at least one memory storing instructions, which, when executed by the at least one processor, may cause the at least processor to generate 1002 spatial beamforming maps locating a sound source using a beamforming model corresponding to acoustic signals received at the plurality of microphones of the microphone array. The spatial beamforming maps for locating the sound source is described herein in detail, for example, using FIG. 5. Accordingly, this operation is not described in more detail again.

The at least one processor may apply 1004 a synthetic aperture expansion to the acoustic signals to increase resolution of the spatial beamforming maps. The synthetic aperture expansion is described in detail in the present disclosure, and, for example, using FIG. 8. Accordingly, those details are not repeated herein for brevity.

The at least one processor may generate 1006 a future visual frame based at least partially upon temporal information extracted from the spatial beamforming maps and visualization maps generated based on the visual signals received by the visual sensor network. The temporal information is extracted from the spatial beamforming maps and visualization maps using a neural network trained to extract the temporal information according to $\mathcal{L}_{future} = (\mathcal{L}_{perc} + \mathcal{L}_{adv}) \ (O_{RGB}^{t+kT}, I_{RGB}^{t+kT})$, wherein, $O_{RGB}^{t+kT} = f_{future} (O_{BF}^{t-n+1, \ldots, t, t+kT}, I_{RGB}^{t-n+1, \ldots, t, t+kT})$ n is integer time steps, and $\mathcal{L}_{perc}$ and $\mathcal{L}_{adv}$ are perceptual and adversarial losses, respectively. The future visual frame may be generated by extrapolating a previous RGB frame $I_{RGB}^{t}$ at time t using signals $O_{BF}^{t+kT}$ in which k is current beamforming sample modulo sampling rate, T is sampling time of a microphone of the microphone array, and t+kT is the current time.

In some embodiments, additionally, or alternatively, a plurality of future visual frames may be generated by cascading predictions of previously predicted visual frames and the corresponding measured audio inputs. The plurality of future visual frames may further provide sufficient or needed time to respond to a situation.

An example technical effect of the methods, systems, and apparatus described herein includes at least one of: (a) improved object detection and understanding using long-range acoustic beamforming; (b) improved object detection performance in low light scenes and for objects that are at least partially occluded or non-line-of-sight; (c) improved performance of environmental sensing by autonomous vehicles; and (d) improved performance of autonomous vehicle maneuvering, routing, or operation more generally.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. An autonomous vehicle, comprising:
    a microphone array of a plurality of microphones;
    a visual sensor network configured to receive visual signals;
    at least one processor; and
    at least one memory storing instructions, which, when executed by the at least one processor, cause the at least one processor to:
    generate spatial beamforming maps locating a sound source using a beamforming model corresponding to acoustic signals received at the plurality of microphones of the microphone array;
    apply a synthetic aperture expansion to the acoustic signals to increase resolution of the spatial beamforming maps; and
    generate a future visual frame based at least partially upon temporal information extracted from the spatial beamforming maps and visualization maps generated based on the visual signals received by the visual sensor network.

2. The autonomous vehicle of claim 1, wherein the temporal information is extracted from the spatial beamforming maps and visualization maps using a neural network trained to extract the temporal information according to $\mathcal{L}_{future} = (\mathcal{L}_{perc} + \mathcal{L}_{adv})\ (O_{RGB}^{t+k}, I_{RGB}^{T+kT})$, wherein, $O_{RGB}^{t+kT} = f_{future}(O_{BF}^{t-n+1}, \ldots, {t,t+kT}, I_{RGB}^{t-n+1}, \ldots, {t,t+kT})$ n is integer time steps, and $\mathcal{L}_{perc}$ and $\mathcal{L}_{adv}$ are perceptual and adversarial losses, respectively.

3. The autonomous vehicle of claim 1, wherein to generate the future visual frame, the instructions further cause the at least one processor to extrapolate a previous RGB frame $I_{RGB}^{t}$ at time t using signals $O_{BF}^{t+kT}$ in which k is current beamforming sample modulo sampling rate, T is sampling time of a microphone of the microphone array, and t+kT is the current time.

4. The autonomous vehicle of claim 3, wherein the instructions further cause the at least one processor to generate a plurality of future visual frames by cascading predictions of previously predicted visual frames and the corresponding measured audio inputs.

5. The autonomous vehicle of claim 3, wherein the plurality of microphones of the microphone array is arranged in a grid pattern of 32×32.

6. The autonomous vehicle of claim 1, wherein a sampling rate of a microphone of the microphone array is different from a sampling rate of a visual sensor of the visual sensor network.

7. The autonomous vehicle of claim 1, wherein the future visual frame is a red, green, and blue (RGB) frame.

8. A computer-implemented method, comprising:
    generating spatial beamforming maps locating a sound source using a beamforming model corresponding to acoustic signals received at a plurality of microphones of a microphone array;
    applying a synthetic aperture expansion to the acoustic signals to increase resolution of the spatial beamforming maps; and
    generating a future visual frame based at least partially upon temporal information extracted from the spatial beamforming maps and visualization maps generated based on visual signals received by a visual sensor network.

9. The computer-implemented method of claim 8, further comprising extracting the temporal information from the spatial beamforming maps and visualization maps using a neural network trained to extract the temporal information according to $\mathcal{L}_{future} = (\mathcal{L}_{perc} + \mathcal{L}_{adv})\ (O_{RGB}^{t+kT}, I_{RGB}^{t+kT})$, wherein, $O_{RGB}^{t+kT} = f_{future}(O_{BF}^{t-n+1}, \ldots, {t,t+kT}, I_{RGB}^{t-n+1}, \ldots, {t,t+kT})$, n is integer time steps, and $\mathcal{L}_{perc}$ and $\mathcal{L}_{adv}$ are perceptual and adversarial losses, respectively.

10. The computer-implemented method of claim 8, wherein the generating the future visual frame comprises extrapolating a previous RGB frame $I_{RGB}^{t}$ at time t using signals $O_{BF}^{t+kT}$ in which k is current beamforming sample modulo sampling rate, T is sampling time of a microphone of the microphone array, and t+kT is the current time.

11. The computer-implemented method of claim 10, further comprising generating a plurality of future visual frames by cascading predictions of previously predicted visual frames and the corresponding measured audio inputs.

12. The computer-implemented method of claim 10, wherein the plurality of microphones of the microphone array is arranged in a grid pattern of 32×32.

13. The computer-implemented method of claim 8, wherein a sampling rate of a microphone of the microphone array is different from a sampling rate of a visual sensor of the visual sensor network.

14. The computer-implemented method of claim 8, wherein the future visual frame is a red, green, and blue (RGB) frame.

15. A non-transitory computer-readable medium (CRM) embodying programmed instructions which, when executed by at least one processor of an autonomous vehicle, cause the at least one processor to perform operations comprising:
generating spatial beamforming maps locating a sound source using a beamforming model corresponding to acoustic signals received at a plurality of microphones of a microphone array;
applying a synthetic aperture expansion to the acoustic signals to increase resolution of the spatial beamforming maps; and
generating a future visual frame based at least partially upon temporal information extracted from the spatial beamforming maps and visualization maps generated based on visual signals received by a visual sensor network.

16. The non-transitory CRM of claim 15, wherein the operations further comprising extracting the temporal information from the spatial beamforming maps and visualization maps using a neural network trained to extract the temporal information according to $\mathcal{L}_{future}=(\mathcal{L}_{perc}+\mathcal{L}_{adv})(O_{RGB}^{t+kT}, I_{RGB}^{t+kT})$ wherein, $O_{RGB}^{t+kT}=f_{future}(O_{BF}^{t-n+1}, \ldots, t, t+kT, I_{RGB}^{t-n+}, \ldots, t, t+kT)$ n is integer time steps, and $\mathcal{L}_{perc}$ and $\mathcal{L}_{adv}$ are perceptual and adversarial losses, respectively.

17. The non-transitory CRM of claim 15, wherein the generating the future visual frame comprises extrapolating a previous RGB frame $I_{RGB}^{t}$ at time t using signals $O_{BF}^{t+kT}$ in which k is current beamforming sample modulo sampling rate, T is sampling time of a microphone of the microphone array, and t+kT is the current time.

18. The non-transitory CRM of claim 17, wherein the operations further comprising generating a plurality of future visual frames by cascading predictions of previously predicted visual frames and the corresponding measured audio inputs.

19. The non-transitory CRM of claim 15, wherein the plurality of microphones of the microphone array is arranged in a grid pattern of 32×32.

20. The non-transitory CRM of claim 15, wherein a sampling rate of a microphone of the microphone array is different from a sampling rate of a visual sensor of the visual sensor network.

* * * * *